W. A. KÖNEMAN.
MOUSE TRAP.
APPLICATION FILED SEPT. 9, 1916.

1,243,428.

Patented Oct. 16, 1917.

Witnesses:

Inventor:
William A. Köneman
By Chapman & Ferguson
Attorney

UNITED STATES PATENT OFFICE.

WILLIAM A. KÖNEMAN, OF BALTIMORE, MARYLAND.

MOUSE-TRAP.

1,243,428.

Specification of Letters Patent.   Patented Oct. 16, 1917.

Application filed September 9, 1916.   Serial No. 119,165.

*To all whom it may concern:*

Be it known that I, WILLIAM A. KÖNEMAN, a citizen of the United States, residing at Baltimore, in the State of Maryland, have invented certain new and useful Improvements in Mouse-Traps, of which the following is a specification.

This invention relates to improvements in mouse traps, and has for its object to provide a mouse trap, or trap for larger animals, which is simple in construction, efficient in operation, and which will be self-adjusting by the single action of throwing the spring bail into position. A further object of my invention is to so arrange the bait hook and bait pit that the said hook cannot be stripped of the bait, and the mouse will be caught by the neck no matter from what angle he may approach the bait.

Traps in use at present require that the spring bail be thrown over, held in position, and while so held an auxiliary bail holding rod must be nicely adjusted to the bait holder, all of which is objectionable as it causes trouble and undue annoyance and often injury to the fingers.

By the use of my present invention the aforegoing objectionable features are overcome as the single operation of throwing the spring bail into position automatically sets the trap and prevents accidental injury to the fingers.

The invention consists in the novel construction, combination and arrangement as herein described, illustrated and claimed.

In the accompanying drawing,—

Figure 1:
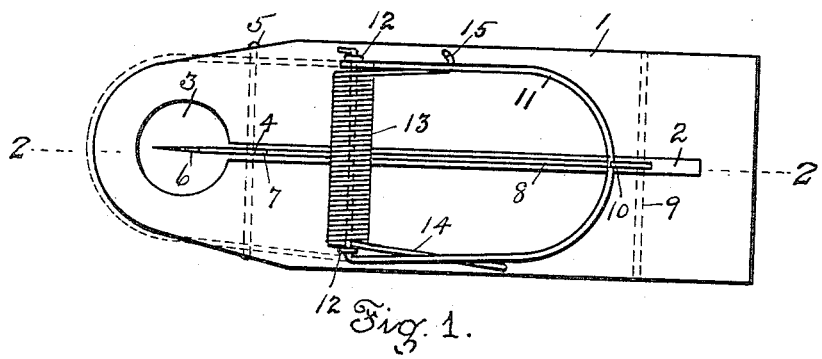
Figure 1 is a plan view of my invention.
Figure 2:
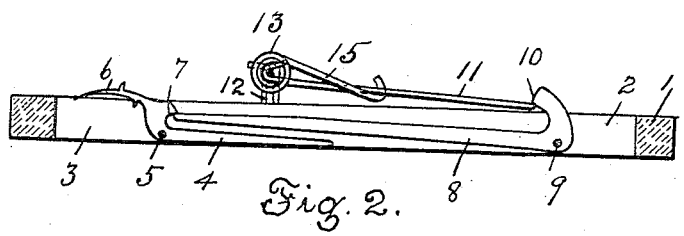
Fig. 2 is a vertical section on the line 2—2 of Fig. 1.

Referring to the accompanying drawings, forming part of this specification, and in which like reference numerals designate like parts through the several views thereof, 1 designates the body which is rounded at one end and which may be made of wood, metal, or other suitable material, and has a slot 2 extending from near one end thereof to and terminating in the opening or bait-pit 3 near the rounded end of said body. The bait hook 4 is pivoted in said slot 2 at 5 and is provided with a pointed barbed end 6 for the bait, and a shoulder 7 above and slightly out of vertical alinement with the pivot 5. Said barbed end 6 projects into the bait-pit 3 slightly above the surface of the body 1. The heel of the bait hook is made sufficiently heavy, as shown in the drawing, so that when the bait hook is pivoted the pointed barb end, when necessary bait is attached thereto, will be held in an upwardly inclined position by the overbalancing weight of the heel portion. It is this feature alone which enables the automatic locking engagement between the bait hook and the lever 8. At the opposite end of said slot 2 the lever 8 is pivoted at 9 where it is constructed with an upwardly projecting shoulder 10 under which the spring bail 4 catches. The forward end of the lever is of such length that it reaches the upper portion of the shoulder 7 of the bait hook. It is essential that the weight of the lever be sufficient to overcome the counterbalancing force of the heel on the bait hook as one of its functions is to tip the bait hook forward so it can slide down the shoulder of the bait hook and drop into the lock notch. It is this gravity interaction between the bait hook and lever which accomplishes the automatic placing of the parts into a lock position before the spring bail is brought into use. The said spring bail 11 extends through and is pivoted to the eyes, or staples, 12 which latter are secured in the body 1. A coiled spring 13 is mounted between said eyes, or staples, 12 and has one end 14 secured to the body 1 and the other end 15 connected to one side of said spring bail 11 to hold the latter in its normal position and to throw said spring bail when the trap is sprung.

To set the trap the spring bail 11 is forced over against the action of the spring 13 and forced down under the shoulder 10 of the lever 8, the upward pressure of said spring bail 11 against the shoulder 10 causes the opposite end of said lever 8 to raise and catch under the shoulder 7 of the bait hook 4 holding the trap in the set position as shown in Fig. 1 of the drawings. The slightest downward movement of the baited end of the bait hook 4 will cause the latter to rock on the pivot 5 and release the end of the lever 8 which in turn releases the spring bail 11 and the latter, through the action of the spring 13, will be thrown over the baited end of the trap to the position shown by dotted lines in Fig. 1 of the drawing. It will thus be seen that the single operation of throwing the spring-bail 11 automatically sets the trap.

From the foregoing description it will be seen that the bait hook projecting into the bait-pit slightly above the surface of the body, prevents the mouse from stripping the bait from the bait hook, and that the body being rounded and the bait-pit also being round and in close proximity to the said rounded end, the mouse will be caught by the neck no matter from what angle he may approach the bait.

Figure 3:
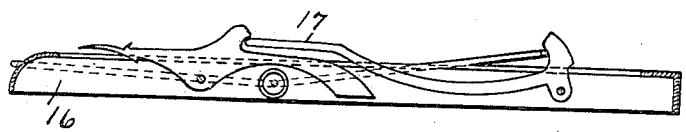
Fig. 3 is a view similar to Fig. 2, of a modification, in which the body of the trap is formed of sheet metal.

In Fig. 3 of the drawing I have shown a modification in which the body 16 is constructed from sheet metal and the bail 17 and spring for operating same are mounted below the upper surface of the body 16.

Slight alterations in the construction and arrangement of the parts and combination of parts, may be made, within the scope of the appended claims.

Having thus described my invention, what I claim is:

1. A trap comprising a body, a pivoted striking bail which is actuated by spring force, a pivoted bait carrier overbalanced at the heel and provided with an inclined shoulder and a lock notch, a lever pivoted at its rear and at the rear of the trap having a shoulder for engaging the spring actuated bail forward of its pivot point and an arm which extends forward and of such length that it engages the bait carrier lock notch and interlocks therewith by gravity, substantially as and for the purpose set forth.

2. A trap comprising a body with a rounded front end having a bait pit or hole at the front and a slot running from the bait pit toward the rear of the body, a pivoted striking bail which is actuated by spring force, a pivoted bait carrier overbalanced at the heel and provided with an inclined shoulder and a lock notch, a lever pivoted at its rear and at the rear of the trap having an inclined shoulder for engaging the spring actuated bail forward of its pivot point and an arm which extends forward and engages the bait carrier lock notch and interlocks therewith by gravity substantially as and for the purpose set forth.

In testimony whereof I affix my signature in the presence of two witnesses.

WILLIAM A. KÖNEMAN.

Witnesses:
CHAPIN A. FERGUSON,
THELMA BEWLEY.

Copies of this patent may be obtained for five cents each, by addressing the "Commissioner of Patents, Washington, D. C."